United States Patent [19]

Bourne

[11] Patent Number: 5,607,712

[45] Date of Patent: Mar. 4, 1997

[54] PROCESSING OF VEGETABLES WHICH ARE FROZEN BEFORE CANNING AND STERILIZING

[75] Inventor: Malcolm C. Bourne, Geneva, N.Y.

[73] Assignee: Cornell Research Foundation, Inc., Ithaca, N.Y.

[21] Appl. No.: 303,938

[22] Filed: Sep. 9, 1994

Related U.S. Application Data

[63] Continuation-in-part of Ser. No. 262,353, Jun. 20, 1994, which is a continuation of Ser. No. 135,575, Oct. 13, 1993, abandoned, which is a continuation of Ser. No. 22,433, Feb. 16, 1993, abandoned, which is a continuation of Ser. No. 540,399, Jun. 19, 1990, abandoned, which is a continuation of Ser. No. 279,907, Dec. 5, 1988, abandoned.

[51] Int. Cl.$^6$ .............................. A23B 7/06; A23B 7/005; A23B 7/10

[52] U.S. Cl. .......................... 426/321; 426/325; 426/508; 426/509; 426/524

[58] Field of Search .................................... 426/321, 325, 426/508, 509, 524

[56] References Cited

U.S. PATENT DOCUMENTS

| | | | |
|---|---|---|---|
| 2,318,426 | 5/1943 | Schroder et al. | 426/252 |
| 4,473,591 | 9/1984 | Segner et al. | 426/615 |
| 4,521,439 | 6/1985 | Bengtsson et al. | 426/509 |

OTHER PUBLICATIONS

W. H. Gardner, 1966, Food Acidulants, Allied Chemical Corp. pp. 163–165 and 167.
Lee et al. Effect of Blanching Treatments on the Firmness of Carrots, J. Food Sci., vol. 44, No. 2, 1979, pp. 615 and 616.
Canet, W., et al, Int. J. Food. Sci. Technol. 22:273–277 (1987).
Lee, C. Y., et al, J. Food Quality 11, 279–287 (1988).
Steinbuch, E., J. Fd. Technol. 11, 313–316 (1976).

*Primary Examiner*—Anthony J. Weier

[57] ABSTRACT

The improved firmness obtained in frozen vegetables by a two-step blanch prior to freezing consisting essentially of a lower temperature blanch to activate pectin methyl esterase in the vegetable to increase firmness followed by a higher temperature blanch to inactivate enzymes thereby to prevent the development of off flavors during frozen storage is retained when the frozen vegetables are canned and heat sterilized. The firming effect is accentuated when the food grade calcium salt is added or when a food grade acid is added to reduce the pH below 4.5. The greatest firming effect is obtained when both a food grade acid and a food grade calcium salt are added.

26 Claims, No Drawings

PROCESSING OF VEGETABLES WHICH ARE FROZEN BEFORE CANNING AND STERILIZING

The invention was made at least in part with Government support under U. S. Army Natick Research, Development and Engineering Center Grant 59-6612-2-0111. The Government has certain rights in the invention.

CROSS-REFERENCE TO RELATED APPLICATIONS

This is a continuation-in-part of Ser. No. 08/262,353, filed Jun. 20, 1994, which in turn is a continuation of Ser. No. 08/135,575, filed Oct. 13, 1993, now abandoned which in turn is a continuation of Ser. No. 08/022,433, filed Feb. 16, 1993 now abandoned which in turn is a continuation of Ser. No. 07/540,399, filed Jun. 19, 1990, now abandoned which in turn is a continuation of Ser. No. 07/279,907, filed Dec. 5, 1988 now abandoned.

TECHNICAL FIELD

This invention is directed to improving the firmness of canned vegetables which are frozen before canning and sterilizing.

BACKGROUND OF THE INVENTION

It is important to maintain the cold chain for frozen vegetables from the factory to the consuming household or institution. Sometimes this is undesirable or impossible. In such case, the vegetables may be canned, to preserve the food value.

One instance where this is case is where frozen vegetables are purchased in bulk in a tropical climate and refrigeration is costly or impossible. In such case, the frozen vegetables are thawed and canned.

Another instance where this is the case is in the production of canned mixed vegetables. These cannot be produced from fresh vegetables because of the different crop months for the various vegetable constituents. For example, carrots are harvested in October, November and December, whereas green peas are harvested in June through mid-July and green beans are harvested from late July through early October. To produce canned mixed vegetables, the various vegetables for the mix are frozen in the season of harvest and then are mixed, and the mix of frozen vegetables is thawed and canned.

Another instance where this is the case is in the year-round production of canned stews and other thermally sterilized food preparations in which vegetables are one of the ingredients. The vegetable ingredients are obtained by thawing frozen vegetables as needed for stew or other thermally sterilized food preparation and canning.

Still another instance where this is the case is production of canned vegetables for the U.S. military. U.S. Army Procurement routinely buys frozen vegetables and thaws them and packs them in tray cans which contain 6½ to 7 pounds of product and which are opened for serving out of the tray.

It is known to use a low-temperature blanch to increase vegetable firmness prior to a higher temperature blanch to deactivate peroxidase to prevent off flavor generation in the production of frozen vegetables. See Canet, W. et al., International Journal of Food Science and Technology, 22, 273–277 (1987) and Bengtsson et al., U.S. Pat. No. 4,521, 439. Moreover Lee, C. Y. et al., Journal of Food Quality 11, 279–287 (1988) provides results of an investigation of the effects of different blanching conditions on residual enzyme activities and quality changes in green beans during frozen storage. Moreover, the parent applications herein are directed to utilizing a low temperature blanch to increase the firmness of canned vegetables. However, there appears to have been no work prior to the invention herein on blanching conditions that are advantageous for vegetables which are frozen before canning.

SUMMARY OF THE INVENTION

It has been discovered herein that the increased firmness obtained in frozen vegetables by a two-step blanch prior to freezing, consisting essentially of a lower temperature blanch to activate pectin methyl esterase in the vegetables to increase firmness followed by a higher temperature blanch to inactivate enzymes thereby to prevent the development of off flavors during frozen storage, is retained when the frozen vegetables are canned and heat sterilized.

The invention herein is directed to a process for improving the firmness of canned vegetables which are frozen before canning, said process comprising the steps of (a) blanching a vegetable in a blanching step under conditions to activate pectin methyl esterase in said vegetable, thereby to firm said vegetable, (b) blanching a vegetable in a succeeding blanching step under conditions to inactivate all enzymes therein thereby to prevent the development of off flavors during step (d), (c) treating vegetable that has been processed in accordance with steps (a) and (b) to produce frozen vegetable, (d) storing the frozen vegetable, (e) removing the frozen vegetable from storage and optionally thawing it, (f) canning the vegetable from step (e), (g) heat sterilizing the canned vegetable.

In a preferred process, step (a) consists essentially of blanching the vegetable at a temperature in the range of 125 to 155° F., very preferably in the range of 140° to 150° F., for two to 60 minutes and then holding the vegetable without the application of heating for about 0 minutes to 120 minutes; and step (b) consists essentially of blanching the vegetable which has been processed in step (a) at a temperature ranging from about 190° to 210° F. for two minutes to 10 minutes.

A further improvement in the firmness is obtained by contacting the vegetables with a food grade acid prior to closing the can. This is preferably carried out by including the food grade acid in blanch water in step (b) to reduce the pH below about 4.5 or by adding said acid into the can just prior to closing of the can.

A further improvement in firmness is also obtained by contacting the vegetable with a food grade calcium salt prior to closing the can. This is preferably carried out by including the food grade calcium salt in blanch water of step (a) and/or in the blanch water of step (b) or by adding said calcium salt into the can just prior to closing of the can.

Firmness can be maximized by contacting the vegetable with a food grade acid and with a food grade calcium salt prior to closing the can. This is preferably carried out by including the food grade acid in blanch water in step (b) to reduce the pH below about 4.5 or by adding said acid into the can just prior to closing of the can and by including the food grade calcium salt in blanch water of step (a) and/or in the blanch water of step (b) or by adding said calcium salt into the can just prior to closing of the can.

The process herein gives especially good results when the vegetables are green beans or green peas or green peppers or carrots.

DETAILED DISCLOSURE

The term "vegetable" is used in the description of the process of the invention herein to include at least green beans, green peas, green peppers, cauliflower, cabbage, broccoli, onions, zucchini, celery, carrots, cucumbers, edible peapods, and wax beans.

As indicated above, step (a) of the process herein is directed to blanching a vegetable in a blanching step under conditions to activate pectin methyl esterase in the vegetable thereby to firm the vegetable and preferably consists essentially of blanching the vegetable at a temperature in the range of 125° to 155° F., very preferably in the range of 140° to 150° F., for two to 30 minutes and then holding the vegetable without the application of heating for 0 minutes to 120 minutes. Very preferably, for small vegetables, the blanching time is two to five minutes. The blanching to a temperature in the range of 125° to 155° F., very preferably in the range of 140° to 150° F., for two to 60 minutes that is preferred in the invention herein can be carried out by immersing the vegetable in water at a selected temperature in said temperature range for the selected time in said time range. Typically the temperature of the water is imparted to the whole of the vegetable during the immersion but this is not necessarily the case. This blanching is typically carried out in a continuous reel-type blancher. Batch blanching in containers of hot water is also possible. Blanching can also be accomplished by the use of steam, heated air or microwaves; the objective being to obtain a selected blanching temperature within the vegetable tissue. Holding the vegetable without the application of heating is carried out by removing the vegetable from in the blancher, e.g., by dumping, and holding the vegetable for the selected period in the stated time range under ambient atmosphere, e.g. by removing the vegetable to a perforated basket or perforated conveyor belt and letting the vegetable remain in this condition for the stated time period.

As indicated above, step (b) of the process herein is directed to blanching a vegetable which has been processed in accordance with step (a) in a succeeding blanching step under conditions to inactivate all the enzymes in the vegetable to prevent the development of off flavors during step (d) and preferably consists essentially of blanching the vegetable which has been processed in step (a) at a temperature ranging from about 190° to 210° F. for two to 10 minutes. There are several enzymes associated with the development of off flavors during frozen storage. The hardest of these to inactivate is peroxidase. Thus, the conditions in step (b) should be sufficient to inactivate peroxidase since such conditions will be sufficient to inactivate all the enzymes. The inactivation of the peroxidase is readily determined by a test known in the trade as the guaiacol test. The result of inactivation of the peroxidase is referred to as being peroxidase negative. The blanching to a temperature in the range of about 190° to 210° F. for two to 10 minutes that is preferred in the invention herein can be carried out by immersing the vegetable in water at the selected temperature in said temperature range for the selected time in said time range. Typically the temperature of the water is imparted to the whole of the vegetable during the immersion but this is not necessarily the case. The step (b) is readily carried out in blanching apparatus of the same type as described for step (a). The blanching in step (b) can also be carried out by the use of steam, heated air or microwaves; the objective being to render the product peroxidase negative.

We turn now to step (c), that is, the step of treating the vegetable that has been processed in accordance with steps (a) and (b) to produce frozen vegetable. For step (c), the vegetable from step (b) is preferably cooled to reduce the load on the freezer, e.g., by spraying tap water on the product situated in a perforated basket or on a perforated belt or by immersing, e.g., in tap water, drained well, e.g., on perforated structure aided by an air blast, and frozen quickly, for example, by using an air blast freezer, liquid nitrogen freezer, or a plate freezer. Most freezers are continuous, receiving the prepared vegetables in one end and after a suitable holding time, usually 15 to 30 minutes, discharging frozen vegetables from the other end.

We turn now to step (d), that is the step of storing the frozen vegetable. The frozen vegetables are usually stored in bulk bins of one-third to two-thirds ton capacity at or below 0° F. in large frozen storage rooms until needed. The length of storage up to one year does not affect texture or flavor.

We turn now to step (e), that is the step of removing the frozen vegetable from storage and preferably thawing it. Upon demand, storage bins may be brought to a dumper and dispensed to where needed. Where a mix of vegetables is desired, dispensing may be carried out from a plurality of bins to a dumper-mixer to provide a mix of vegetable which is metered therefrom. The preferred thawing is such that all parts of the vegetable are above freezing temperature. Thawing is readily carried out by immersing in water or spraying with water.

We turn now to step (f), i.e. the step of canning the vegetable from step (e). Canning is carried out by filling vegetable from step (e) into cans which can be composed of metal, glass or plastic compositions, with or without other ingredients, e.g., using mechanical filling machines which preferably vibrate the cans to ensure no cans are underfilled. Where vegetables are being canned, as opposed to vegetables together with other food groups, e.g., a stew, hot water and if desired, a metered amount of salt (or instead a hot salt brine may be used), e.g., 190° to 210° F. water is introduced into the vegetable filled cans, and the cans are hermetically sealed, e.g., using conventional sealing apparatus.

As indicated above, further improvement in firmness is obtained by contacting the vegetable with a food grade acid prior to closing the can. As indicated above, this is preferably carried out by including the food grade acid in blanch water of step (b) to reduce the pH in the vegetable below about 4.5, e.g., to reduce the pH to about 4.2. The food grade acid is also readily added directly to the can contents, e.g., by including it in the hot water added into the can in the canning step. The food grade acid may also be included in the blanch water of step (a). Suitable acids include, for example, ascorbic acid, citric acid, adipic acid, succinic acid, vinegar, acetic acid, phosphoric acid, lactic acid, tartaric acid, malic acid, fumaric acid, sulfuric acid, and glucono-delta-lactone (which hydrolyzes to gluconic acid in water).

As indicated above, further improvement in firmness is obtained by contacting the vegetable with a food grade calcium salt prior to closing the can. As indicated above, this is preferably carried out by including a food grade calcium salt in blanch water of step (a) and/or in the blanch water of step (b). The food grade calcium salt is also readily added directly to the can contents, e.g., by including it in the hot water added into the can in the canning step. The calcium salt is included to obtain an added calcium salt level in the vegetable not to exceed 0.4%. Typically the calcium salt is included to obtain in the vegetable an added calcium salt level ranging from 0.05% to 0.15%. Calcium chloride, $CaCl_2$, is a preferred calcium salt for use for this purpose. Other suitable food grade calcium salts include, e.g., calcium acetate, calcium gluconate, calcium lactate, and calcium sulfate.

As indicated above, firmness can be maximized by contacting the vegetable with a food grade acid and with a food grade calcium salt prior to closing the can. The food grade acid is preferably included in the blanch water of step (b) to reduce the pH in the vegetable below about 4.5, e.g., to reduce the pH to about 4.2. The food grade acid is also readily added directly to the can contents, e.g., by including it in the hot water added into the can in the canning step. The food grade acid may also be included in the blanch water of step (a). The food grade calcium salt is preferably included in the blanch water of step (a) and/or in the blanch water of step (b). The food grade calcium salt is also readily added directly to the can contents, e.g., by including it in the hot water added into the can of the canning step. The calcium salt is included to obtain an added calcium salt level in the vegetable not to exceed 0.4%. Typically the calcium salt is included to obtain in the vegetable an added calcium salt level ranging from 0.05% to 0.15% Suitable acids and calcium salts comprise those listed above.

We turn now to step (g), that is the step of heat sterilizing the canned vegetable. In the art, this is called processing and is carried out on the sealed container typically in a continuous rotary pressure retort or hydrostatic retort or in a still retort. Typically, commercial sterilization is carried out in still retorts in accordance with tables in Bulletin 26-L of the National Food Processors Association for metal containers and in accordance with tables in Bulletin 30-L of the National Food Processors Association for glass containers or in continuous retorts in accordance with determinations of heat penetration studies by or in cooperation with a thermal process authority such as the National Food Processors Association (NFPA). For example, sterilization of low-acid foods (pH above 4.5) in 303×406 cans (typical one lb. can) in still retorts is carried out at 240° to 250° F. for 30 to 10 minutes and, sterilization for foods at a pH less then about 4.5 in 303×406 cans in still retorts is carried out for 20 to 10 minutes at 210° to 220° F. U.S. military specifications for canned vegetables call for processes that ensure destruction of bacterial spores even more heat resistant than Cl. Botulinum, for example, *Clostridium thermosaccharolyticum* and *Bacillus Stearothermophilus*. This requires longer process times than those used in normal commercial processes.

Apparatus for blanching, canning and sterilization are well known in the art. A comprehensive discussion of such apparatus is found in a three volume set titled, A Complete Course in Canning and Related Processes, 12th edition, Lopez, A., ed., The Canning Trade Inc., Baltimore, Md., 1987.

The invention is illustrated in the specific examples below.

In the experiments of the examples, blanching in steps (a) and (b) was carried out by immersing vegetables in hot water (the hot water being at the stated blanching temperature) in either a batch stainless steel kettle or in a continuous reel blancher and holding after removal from the blancher in step (a) was carried out by dumping into a perforated nylon basket without cooling and maintaining the basket under ambient conditions The vegetables were removed from the blancher of step (b) and immersed in cold tap water. The cooled vegetables were drained. Freezing of the drained vegetables was carried out in an air blast freezer. The frozen vegetables were stored in plastic bags in a zero degree F. temperature room. Upon removal from storage, the vegetables were immersed in tap water. The thawed vegetables were canned in #303 cans including 0.75% salt, and sterilization was carried out in still retorts. Firmness data was obtained by opening the cans and measuring firmness using a back extrusion cell (7.4 cm I.D. by 7.8 cm internal height with a 4 mm wide annulus mounted in an Instron Universal Testing Machine with a crosshead speed of 30 cm/min). This machine plots on a strip chart the force required to extrude the vegetable up through the 4 mm wide annulus between the descending ram and the inside wall of the back extrusion cell. The test was replicated eight times for each sample. The maximum force was measured from the Instron Chart and the mean value was calculated for each treatment. The results are given in newtons (denoted "N").

There was no off odor associated with thawed product of any example hereinunder where a 205° F. blanching step was included.

EXAMPLE I

Green beans (True Blue Cultivar) were processed by blanching, followed by freezing, storing in frozen state overnight or longer, thawing, canning and sterilizing.

In particular, a control batch was blanched for 4 minutes at 205° F., frozen, thawed, stored, canned and sterilized at 240° F. for 40 minutes. Firmness was determined to be 180N. When $CaCl_2$ was included in the blanch water to obtain about 0.07% added calcium chloride in the vegetable tissue, the firmness was determined to be 212N.

For the case within the scope of the invention herein, where blanching was carried out for four minutes at 145° F. followed by holding for 30 minutes, followed by blanching for three minutes at 205° F., followed by freezing, storing, thawing, canning and sterilizing at 240° F. for 40 minute, firmness was determined to be 309N. Where $CaCl_2$ was included in the 205° F. blanch water to obtain about 0.07% added calcium chloride in the vegetable tissue, the firmness was determined to be 378N.

For the case within the scope of the invention herein, where blanching was carried out for four minutes at 145° F. followed by holding for 60 minutes, followed by blanching for three minutes at 205° F., followed by freezing, storing, thawing, canning and sterilizing at 240° F. for 40 minutes, firmness was determined to be 329N. Where $CaCl_2$ was included in the 205° F. blanch water to obtain about 0.07% added calcium chloride in the vegetable tissue, the firmness was determined to be 410N.

EXAMPLE II

Green beans (Labrador Cultivar) were processed by blanching followed by freezing, storing in frozen state overnight or longer, thawing, canning and sterilizing. In all cases, sterilizing was carried out at 240° F. for 40 minutes. The blanching step was varied.

In a control run, blanching was carried out for four minutes at 205° F. Firmness was determined to be 135N. Where $CaCl_2$ was included in the blanch water to obtain about 0.07% added calcium chloride in the vegetable tissue, firmness was determined to be 162N.

For the case within the scope of the invention where blanching was carried out for four minutes at 145° F. followed by holding in the absence of further heating for 30 minutes followed by blanching for three minutes at 205° F., firmness was determined to be 265N. Where $CaCl_2$ was included in the 205° F. blanch water to obtain about 0.07% added calcium chloride in the vegetable tissue, the firmness was determined to be 334N.

For the case within the scope of the invention where blanching was carried out for four minutes at 145° F. followed by holding in the absence of further heating for 60 minutes, followed by blanching for three minutes at 205° F., firmness was determined by to be 269N. Where $CaCl_2$ was included in the 205° F. blanch water to obtain about 0.07% added calcium chloride in the vegetable tissue, the firmness was determined to be 338N.

EXAMPLE III

Green peas (Payload Cultivar, Tenderometer 112) were processed by blanching followed by freezing, storing in frozen state overnight or longer, thawing, canning and sterilizing. Sterilizing was carried out in still retorts at 240° F. for 40 minutes except where acid was included sterilizing was carried out for 30 minutes at 215° F. The blanching step was varied as indicated.

In a control run, blanching was carried out for four minutes at 205° F. Firmness was determined to be 256N. Where $CaCl_2$ was added into the can to obtain about 0.07% added calcium chloride in the vegetable tissue, the firmness was determined to be 318N. When the pH in the can was lowered using citric acid to obtain a pH of about 4.2 in the vegetable, firmness was determined to be 785N. When $CaCl_2$ was added into the can to obtain about 0.07% added $CaCl_2$ in the vegetable and the pH in the can was lowered using citric acid to obtain a pH of about 4.2 in the vegetable, firmness was determined to be 941N.

For the case within the scope of the invention where blanching was carried out for four minutes at 145° F. followed by holding in the absence of further heating for 30 minutes, followed by blanching for three minutes at 205° F., firmness was determined to be 401N. When $CaCl_2$ was added into the can to obtain about 0.07% added calcium chloride in the vegetable tissue, the firmness was determined to be 524N. When the pH in the can was lowered using citric acid to obtain a pH of about 4.2 in the vegetable, firmness was determined to be 974N. When $CaCl_2$ was added into the can to obtain 0.07% added $CaCl_2$ in the vegetable and the pH in the can was lowered using citric acid to obtain a pH of about 4.2 in the vegetable, firmness was determined to be 1205N.

EXAMPLE IV

Green peas (Payload Cultivar, Tenderometer 118) were processed by blanching followed by freezing, storing in frozen state overnight or longer, thawing, canning and sterilizing. In all cases, sterilizing was carried out at 240° F. for 40 minutes in still retorts. The blanching step was varied as indicated.

In a control run, blanching was carried out for four minutes at 205° F. Firmness was determined to be 195N. When $CaCl_2$ was added into the can to obtain about 0.07% added calcium chloride in the vegetable tissue, the firmness was determined to be 246N. In cases for comparison where the blanching was followed by canning, firmness was determined to be 195N and when blanching was followed by canning with the inclusion of $CaCl_2$ in the can to obtain about 0.07% added calcium chloride in the vegetable tissue, firmness was determined to be 246N.

For the case within the scope of the invention where blanching was carried out for four minutes at 145° F. followed by holding in the absence of further heating for 30 minutes, followed by blanching for three minutes at 205° F., firmness was determined by to be 261N. When $CaCl_2$ was added into the can to obtain about 0.07% added calcium chloride in the vegetable tissue, the firmness was determined to be 313N. In cases for comparison where blanching for four minutes at 145° F. followed by a 30 minute hold period was followed by canning, firmness was determined to be 248N and where blanching for four minutes at 145° F. followed by a 30 minute hold period was followed by canning and $CaCl_2$ was added into the can to obtain about 0.07% added calcium chloride in the vegetable tissue, the firmness was determined to be 338N.

EXAMPLE V

Green beans were processed as shown and results are shown in Table 1 below.

All the runs are within the scope of the invention except for Runs 1 and 6.

$H_3PO_4$ where indicated was included in the 205°F. blanch water.

$H_3PO_4$ was used to lower the pH of the vegetable to about 4.2.

$CaCl_2$ where indicated was included in the 145° F. blanch water and in the 205° F. blanch water, to obtain about 0.07% added calcium chloride in the vegetable tissue.

TABLE 1

| Run No. | Period of 145° F. Blanch (min.) | Hold Time (min.) | Period of 205° F. Blanch (min.) | Freezing | Storage Period | Thawing | Canning | Sterilization Conditions | $H_3PO_4$ | $CaCl_2$ | Time after Canning of Firmness Determination | Firmness (N) |
|---|---|---|---|---|---|---|---|---|---|---|---|---|
| 1 | 3 | 30 | 3 | No | No | No | Yes | 14 min., 250° F. | No | No | None | 351 ± 12.3 |
| 2 | 3 | 30 | 3 | Yes | 1 week | Yes | Yes | 14 min., 250° F. | No | No | 3 weeks | 334 ± 11.0 |
| 3 | 3 | 30 | 3 | Yes | 1 week | Yes | Yes | 14 min., 250° F. | No | No | 3 months | 349 ± 10.3 |
| 4 | 3 | 30 | 3 | Yes | 3 months | Yes | Yes | 14 min., 250° F. | No | No | 2 weeks | 325 ± 9.6 |
| 5 | 3 | 30 | 3 | Yes | 3 months | Yes | Yes | 14 min., 250° F. | No | No | 3 months | 351 ± 15.1 |
| 6 | None | None | 3 | Yes | 1 week | Yes | Yes | 14 min., 250° F. | No | No | 2 weeks | 233 ± 6.7 |
| 7 | 3.5 | 30 | 3 | Yes | 1 week | Yes | Yes | 14 min., 250° F. | No | No | 2 weeks | 364 ± 10.6 |
| 8 | 3.5 | 30 | 3 | Yes | 1 week | Yes | Yes | 14 min., 250° F. | No | No | 3 months | 390 ± 17.0 |
| 9 | 3.5 | 30 | 3 | Yes | 1 week | Yes | Yes | 15 min., 215° F. | Yes | No | 2 weeks | 1818 ± 87.9 |

TABLE 1-continued

| Run No. | Period of 145° F. Blanch (min.) | Hold Time (min.) | Period of 205° F. Blanch (min.) | Freez-ing | Storage Period | Thaw-ing | Can-ning | Sterilization Conditions | $H_3PO_4$ | $CaCl_2$ | Time after Canning of Firmness De-termination | Firmness (N) |
|---|---|---|---|---|---|---|---|---|---|---|---|---|
| 10 | 3.5 | 30 | 3 | Yes | 1 week | Yes | Yes | 15 min., 215° F. | Yes | No | 3 months | 1796 ± 68.0 |
| 11 | 3.5 | 30 | 3 | Yes | 6 weeks | Yes | Yes | 14 min., 250° F. | Yes | No | 4 weeks | 543 ± 16.3 |
| 12 | 3.5 | 30 | 3 | Yes | 5 weeks | Yes | Yes | 14 min., 250° F. | No | No | 3 weeks | 311 ± 9.8 |
| 13 | 3.5 | 30 | 3 | Yes | 5 weeks | Yes | Yes | 14 min., 250° F. | No | No | 3 months | 314 ± 10.8 |
| 14 | 4 | 30 | 3 | Yes | 5 weeks | Yes | Yes | 14 min., 250° F. | No | Yes | 2 weeks | 526 ± 21.6 |
| 15 | 4 | 30 | 3 | Yes | 5 weeks | Yes | Yes | 14 min., 250° F. | No | Yes | 3 months | 557 ± 17.9 |

EXAMPLE VI

Green peppers were processed as shown and results are shown in Table 2 below.

All the runs are within the scope of the invention except for Runs 1 and 15.

$CaCl_2$ where indicated was included in the 145° F. blanch water and in the 205° F. blanch water, to obtain a level of added $CaCl_2$ in the final product of about 0.07%.

$H_3PO_4$ where indicated was included in the 205° F. blanch water. $H_3PO_4$ was used to lower the pH in the vegetable tissue to about 4.2.

(sterilization at 250° F. for 15 minutes), firmness was determined to be 248N±8.5. When $CaCl_2$ was added into the can to obtain about 0.07% added $CaCl_2$ in the vegetable tissue (sterilization at 250° F. for 15 minutes), the firmness was determined to be 289N±8.3. Where the pH in the can was lowered with citric acid to obtain a pH of about 4.2 in the vegetable (sterilization at 215° F. for 15 minutes), the firmness was determined to be 883N±57.8.

In runs within the scope of the invention, green beans were blanched for five minutes at 145° F., held without heating for 30 minutes, blanched for three minutes at 200 to 205° F., frozen, stored in frozen state about 2 weeks, thawed,

TABLE 2

| Run No. | Period of 145° F. Blanch (min.) | Hold Time (min.) | Period of 205° F. Blanch (min.) | Freez-ing | Storage Period | Thaw-ing | Can-ning | Sterilization Conditions | $H_3PO_4$ | $CaCl_2$ | Time after Canning of Firmness De-termination | Firmness (N) |
|---|---|---|---|---|---|---|---|---|---|---|---|---|
| 16 | 3 | 30 | 3 | No | No | No | Yes | 14 min., 250° F. | No | No | None | 116 ± 7.0 |
| 17 | 3 | 30 | 3 | Yes | 1 week | Yes | Yes | 14 min., 250° F. | No | No | 2 weeks | 127 ± 6.7 |
| 18 | 3 | 30 | 3 | Yes | 1 week | Yes | Yes | 14 min., 250° F. | No | No | 3 months | 121 ± 10.6 |
| 19 | 3 | 30 | 3 | Yes | 3 months | Yes | Yes | 14 min., 250° F. | No | No | 2 weeks | 132 ± 5.8 |
| 20 | 3 | 30 | 3 | Yes | 3 months | Yes | Yes | 14 min., 250° F. | No | No | 3 months | 141 ± 5.1 |
| 21 | 3 | 30 | 3 | Yes | 1 week | Yes | Yes | 14 min., 250° F. | No | No | 2 weeks | 131 ± 9.8 |
| 22 | 3 | 30 | 3 | Yes | 1 week | Yes | Yes | 14 min., 250° F. | No | No | 3 months | 136 ± 12.8 |
| 23 | 3 | 30 | 3 | Yes | 1 week | Yes | Yes | 14 min., 250° F. | No | Yes | 2 weeks | 172 ± 5.7 |
| 24 | 3 | 30 | 3 | Yes | 1 week | Yes | Yes | 14 min., 250° F. | No | Yes | 3 months | 177 ± 8.8 |
| 25 | 3 | 30 | 3 | Yes | 1 week | Yes | Yes | 14 min., 250° F. | No | No | 2 weeks | 138 ± 8.9 |
| 26 | 3 | 30 | 3 | Yes | 1 week | Yes | Yes | 14 min., 250° F. | No | No | 3 months | 132 ± 9.6 |
| 27 | 3 | 30 | 3 | Yes | 1 week | Yes | Yes | 15 min., 215° F. | Yes | No | 2 weeks | 198 ± 23.3 |
| 28 | 3 | 30 | 3 | Yes | 1 week | Yes | Yes | 15 min., 215° F. | Yes | No | 3 months | 208 ± 25.8 |
| 29 | No | No | 3 | Yes | 1 week | Yes | Yes | 14 min., 250° F. | No | No | 2 weeks | 98 ± 8.3 |

EXAMPLE VII

In a control run, green peppers were blanched for four minutes at 212° F., frozen, stored in the frozen state overnight or longer, canned with acid to lower the pH in the vegetable to 3.27 and with 0.2% $CaCl_2$ in the canning liquid which gives approximately 0.07% added $CaCl_2$ in the vegetable. The firmness was determined to be 186N.

In a run within the scope of the invention, green peppers were blanched for 30 minutes at 145° F. and then for 3 minutes at 212° F., frozen, stored in the frozen state overnight or longer, canned with acid to lower the pH in the vegetable to 3.44 and with 0.2% $CaCl_2$ in the canning liquid which gives approximately 0.07% added $CaCl_2$ in the vegetable. The firmness was determined to be 496N.

EXAMPLE VIII

In control runs, green beans were blanched three minutes at 200° to 205° F. frozen stored in frozen state about 2 weeks, thawed, canned and sterilized. When canned as is canned and sterilized. When canned as is (sterilization at 250° F. for 15 minutes), firmness was determined to be 396N±11.5. When $CaCl_2$ was added into the can to obtain about 0.07% added $CaCl_2$ in the vegetable tissue (sterilization at 250° F. for 15 minutes), firmness was determined to be 473N±15.0. When the pH in the can was lowered using citric acid to obtain a pH of about 4.2 in the vegetable (sterilization at 215° F. for 15 minutes), firmness was determined to be 1,633N±153.2. When $CaCl_2$ was added into the can to obtain about 0.07% added $CaCl_2$ in the vegetable and the pH in the can was lowered using citric acid to obtain a pH of about 4.2 in the vegetable (sterilization at 215° F. for 15 minutes), firmness was determined to be 2040N±126.7.

EXAMPLE IX

In control runs, whole carrots were blanched eight minutes at 205° F., lye peeled (i.e., placed in 5 to 10% aqueous NaOH at near boiling until the skin is loosened), rinsed to remove skins and resisual caustic, diced, cooled by spraying with tap water, frozen, stored overnight in frozen state, thawed in a water bath, canned and sterilized. When canned as is (sterilization at 250° F. for 24 minutes), firmness was determined to be 108N±3.3. When CaCl₂ was added into the can to obtain about 0.07% added CaCl₂ in the vegetable tissue (sterilization at 250° F. for 24 minutes), the firmness was determined to be 131N±0.8. Where the pH in the can was lowered with citric acid to obtain a pH of 4.1 in the vegetable (sterilization at 215° F. for 15 minutes), the firmness was determined to be 614N±20.5. When CaCl₂ was added into the can to obtain about 0.07% added CaCl₂ in the vegetable and the pH in the can was lowered using citric acid to obtain a pH of 4.2 in the vegetable (sterilization at 215° F. for 15 minutes, firmness was determin to be 734N±46.

In runs within the scope of the invention, whole carrots were blanched for 30 minutes at 145° F., lye peeled, rinsed, diced, blanched for three minutes at 205° F., cooled by spraying with tap water, frozen, stored overnight in frozen state, thawed in a water bath, canned and sterilized. When canned as is (pH in the vegetable tissue of 5.3 and sterilization at 250° F. for 24 minutes), firmness was determined to be 188N±5.9. When CaCl₂ was added into the can to obtain about 0.07% added CaCl₂ in the vegetable tissue (pH in the vegetable tissue of 5.2 and sterilization at 250° F. for 24 minutes), firmness was determined to be 240N±5.7. When the pH in the can was lowered using citric acid to obtain a pH of 4.2 in the vegetable (sterilization at 215° F. for 15 minutes), firmness was determined to be 1025N±58.2. When CaCl₂ was added into the can to obtain about 0.07% added CaCl₂ in the vegetable and the pH in the can was lowered using citric acid to obtain a pH of 4.2 in the vegetable (sterilization at 215° F. for 15 minutes), firmness was determined to be 1135N±70.1.

Many variations of the inventive embodiments will be obvious to those skilled in the art. Thus, the inventive embodiments are defined by the claims.

What is claimed is:

1. A process for improving the firmness of canned vegetables which are frozen before canning, said process comprising the steps of:
   (a) blanching a vegetable in a blanching step under conditions to activate pectin methyl esterase in said vegetable, thereby to firm said vegetable, which consists essentially of blanching said vegetable at a temperature in the range of 125° to 155° F. for two to 60 minutes and then holding the vegetable without the application of heating for about zero minutes to 120 minutes,
   (b) blanching said vegetable in a succeeding blanching step under conditions to inactivate all enzymes therein thereby to prevent the development of off flavors during step (d), which consists essentially of blanching the vegetable which has been processed in step (a) at a temperature ranging from about 190° to 210° F. for two to 10 minutes,
   (c) treating vegetable that has been previously processed in accordance with steps (a) and (b), to produce frozen vegetable,
   (d) storing the frozen vegetable,
   (e) removing the frozen vegetable from storage and optionally thawing it,
   (f) canning the vegetable obtained in step (e),
   (g) heat sterilizing the canned vegetable.

2. The process of claim 1 wherein the vegetable is green beans.

3. The process of claim 1 wherein the vegetable is green peas.

4. The process of claim 1 wherein the vegetable is green peppers.

5. The process of claim 1 wherein the vegetable is carrots.

6. The process of claim 1 wherein the vegetable is contacted with a food grade acid prior to closing the can in step (f) to reduce the pH in the vegetable tissue below about 4.5.

7. The process of claim 6 wherein the vegetable is green beans.

8. The process of claim 6 wherein the vegetable is green peas.

9. The process of claim 6 wherein the vegetable is green peppers.

10. The process of claim 6 wherein the vegetable is carrots.

11. The process of claim 1 wherein the vegetable is contacted with a food grade calcium salt prior to closing the can in step (f).

12. The process of claim 11 wherein the vegetable is green beans.

13. The process of claim 11 wherein the vegetable is green peas.

14. The process of claim 11 wherein the vegetable is green peppers.

15. The process of claim 11 wherein the vegetable is carrots.

16. The process of claim 1 wherein the vegetable is contacted with a food grade acid prior to closing the can in step (f) and wherein the vegetable is contacted with a food grade calcium salt prior to closing the can in step (f).

17. The process of claim 16 wherein the vegetable is green beans.

18. The process of claim 16 wherein the vegetable is green peas.

19. The process of claim 16 wherein the vegetable is green peppers.

20. The process of claim 16 wherein the vegetable is carrots.

21. The process of claim 1 wherein blanching consists of a two-step blanch.

22. The process of claim 11 wherein the vegetable is contacted with a food grade calcium salt by including said calcium salt in blanch water, said calcium salt being selected from the group consisting of calcium acetate, calcium gluconate, calcium lactate, calcium sulfate and calcium chloride.

23. The process of claim 22 wherein the food grade calcium salt is included in the blanch water of step (b).

24. The process of claim 23 wherein the vegetable is green beans.

25. The process of claim 6 wherein said acid is selected from the group consisting of ascorbic acid, citric acid, adipic acid, succinic acid, vinegar, acetic acid, phosphoric acid, lactic acid, tartaric acid, malic acid, fumaric acid and sulfuric acid.

26. The process of claim 6 wherein the vegetable is contacted with a food grade acid by including said acid in blanch water.

* * * * *